May 16, 1961 H. L. LAMBERT 2,984,328
CARRIAGE POSITIONING MECHANISM FOR TYPEWRITERS OR LIKE MACHINES
Filed Jan. 17, 1957 6 Sheets-Sheet 1

INVENTOR
HARRY LONG LAMBERT
BY
Baldwin & Wight
ATTORNEYS

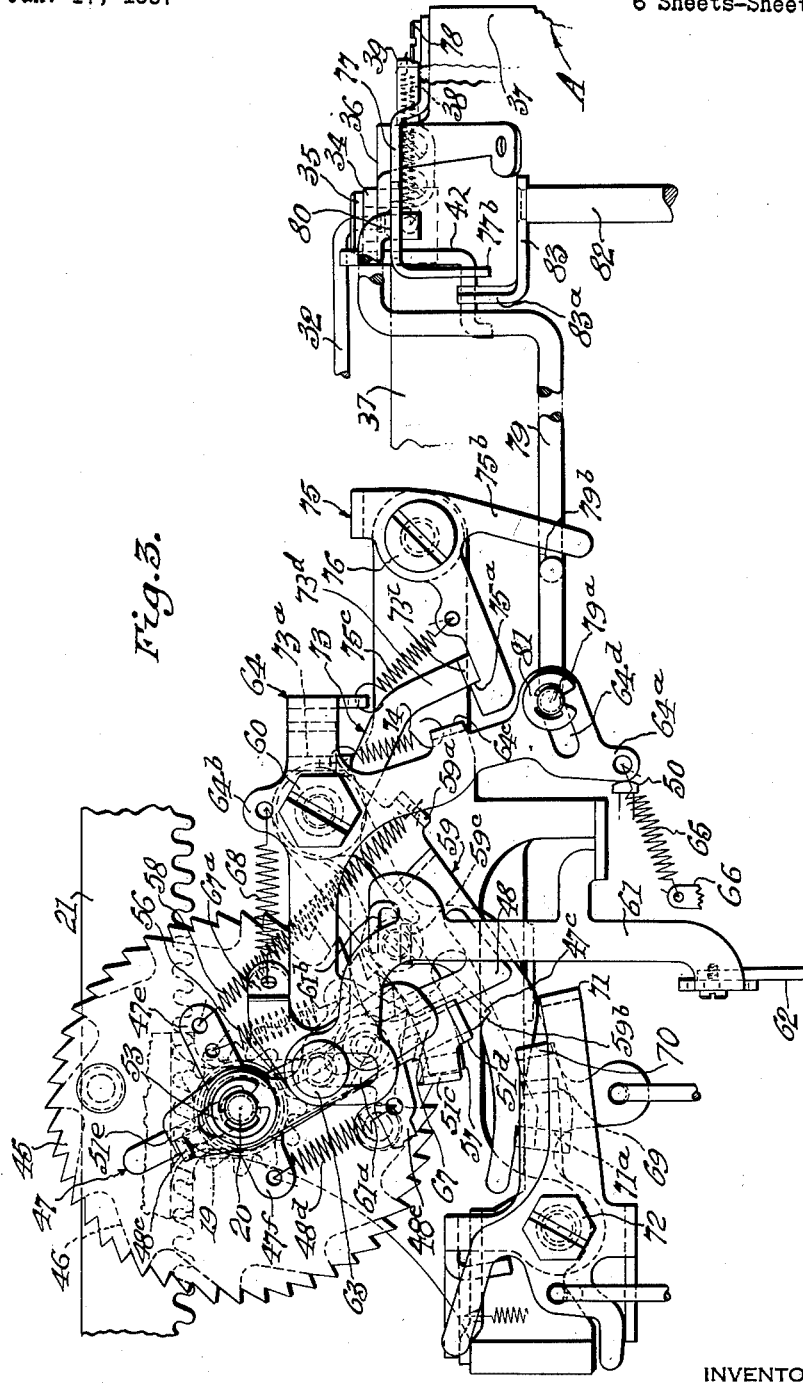

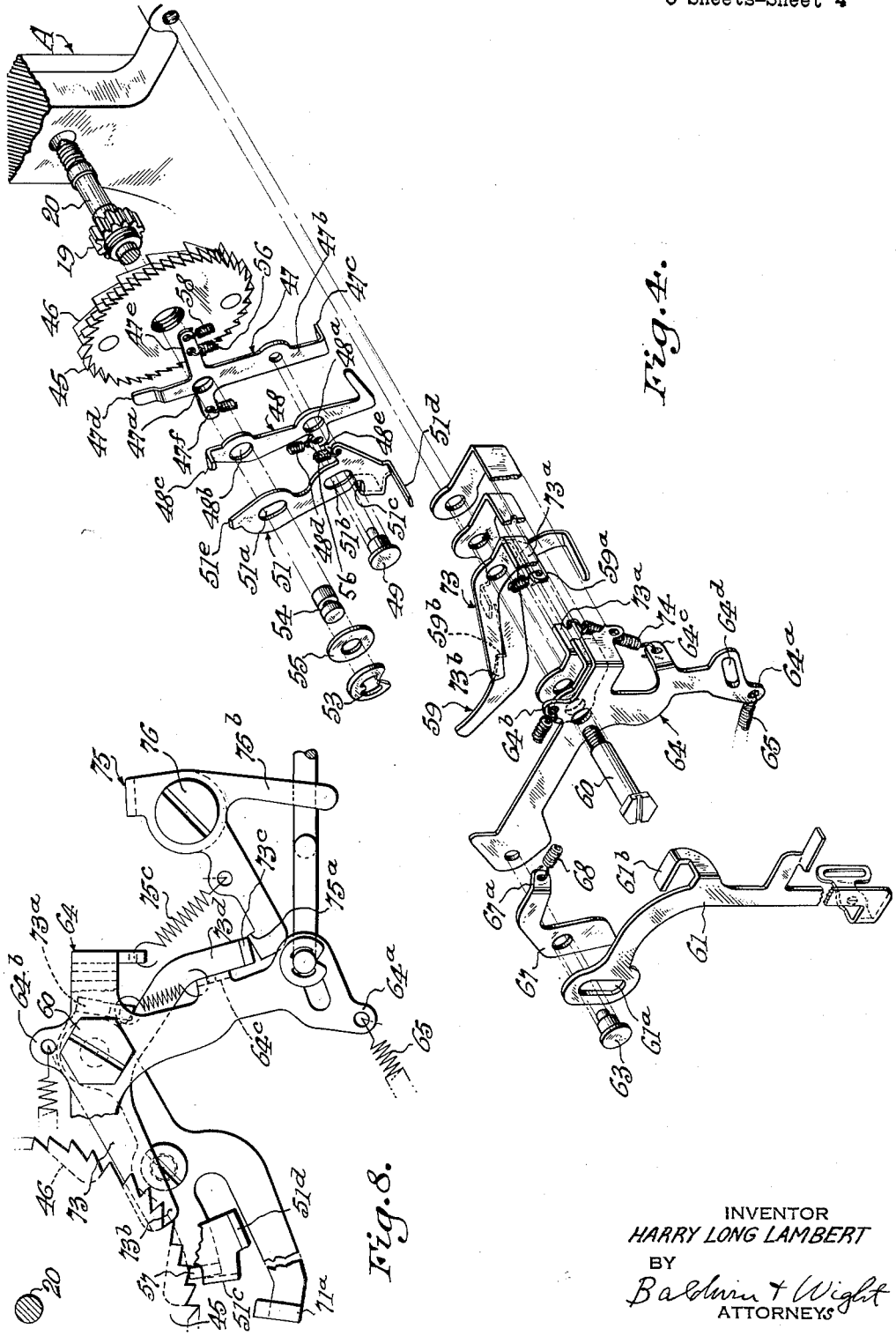

May 16, 1961  H. L. LAMBERT  2,984,328
CARRIAGE POSITIONING MECHANISM FOR TYPEWRITERS OR LIKE MACHINES
Filed Jan. 17, 1957  6 Sheets-Sheet 5
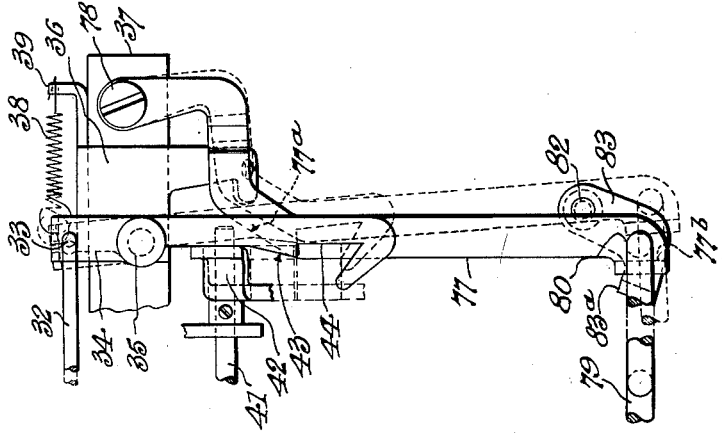
Fig. 6.
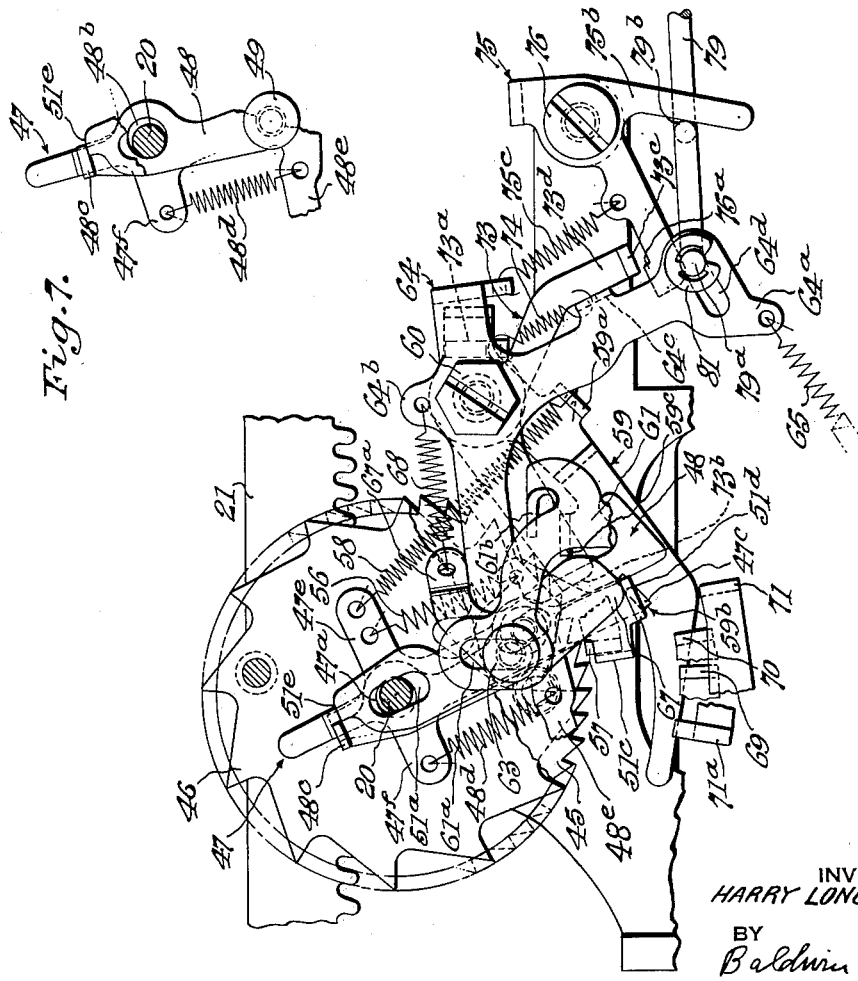
Fig. 7.
Fig. 5.
INVENTOR
HARRY LONG LAMBERT
BY
Baldwin & Wight
ATTORNEYS

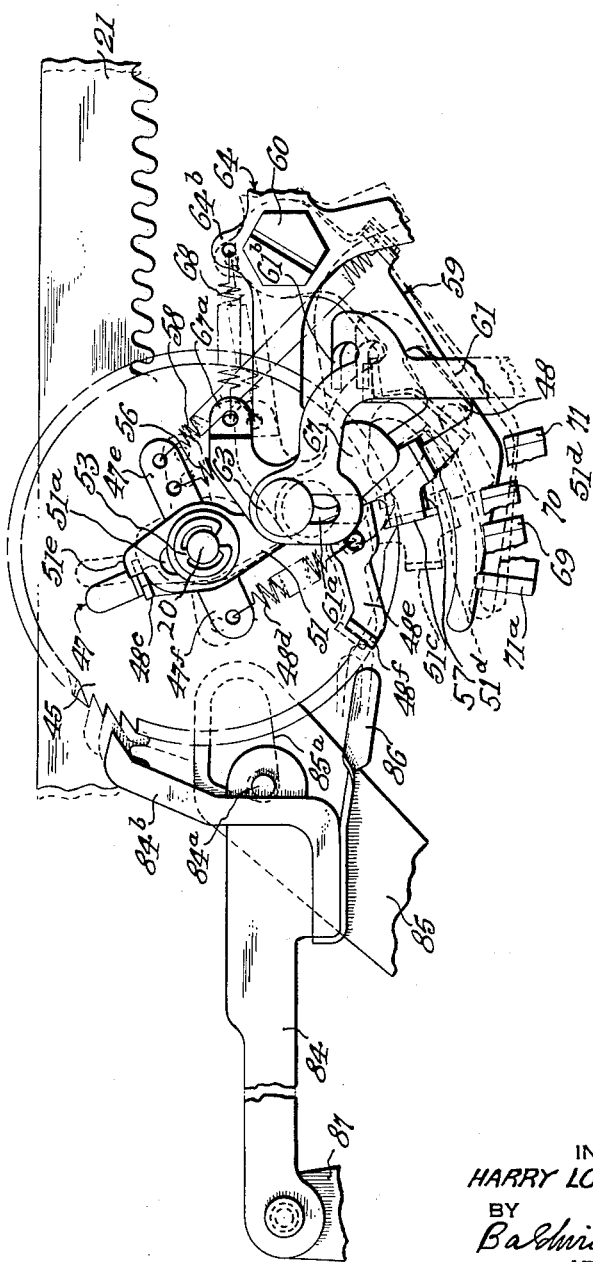

United States Patent Office 2,984,328
Patented May 16, 1961

2,984,328

CARRIAGE POSITIONING MECHANISM FOR TYPEWRITERS OR LIKE MACHINES

Harry Long Lambert, West Hartford, Conn., assignor to Royal McBee Corporation, New York, N.Y., a corporation of New York Filed Jan. 17, 1957, Ser. No. 634,684

16 Claims. (Cl. 197—66)

This invention relates to carriage positioning mechanism for typewriters or like machines, and more particularly to proportional letter spacing mechanism and auxiliary mechanism for positiong the traveling carriage of such machines accurately at the conclusion of carriage travel other than incremental letter spacing travel, for example, at the end of relatively long continuous uninterrupted travel, e.g. carriage tabulating travel or carriage returning travel.

Many typewriters are so constructed that the position of the carriage established at the end of a relatively long carriage travel, during which the carriage acquires considerable speed, is established by the escapement mechanism which is also employed for controlling the incremental letter spacing carriage movement. Most of such escapement mechanisms include pawl and ratchet devices, the ratchet elements of which are formed with rather closely spaced teeth. The positioning of the carriage at the end of a long run, either carriage returning or tabulating, has frequently been erratic because when the carriage is arrested at the end of its run by tabulating or margin stops, it rebounds to varying extents, depending upon its speed at the time of impact, with the result that the escapement or carriage positioning pawls do not always engage the particular ratchet tooth which must be engaged in order to establish the carriage position precisely. These difficulties have been aggravated in the later development of typewriting machines because of the tendency to employ very fine pitch ratchets as parts of proportional letter spacing mechanisms, and also because of the use of power operated mechanism for effecting carriage returning movements at high speeds.

Various attempts have previously been made to overcome the difficulties of accurately positioning carriages at the ends of long runs, such for example as by providing for a predetermined over-travel or restrictive travel of certain components of the escapement mechanism. Mechanisms constructed in accordance with these prior proposals have left much to be desired as to the consistent and accurate positioning of typewriter and similar machine carriages at the ends of extended continuous movements.

An object of the present invention is to provide improved mechanism operable in conjunction with the carriage incremental letter spacing mechanism in such a manner that the carriage positioning control normally exercised by carriage letter spacing mechanism is superseded by control exercized by auxiliary mechanism which is dependable and consistent in accurately establishing the position of the carriage at the conclusion of a continuous uninterrupted carriage travel, usually longer than a single increment of carriage letter spacing movement.

Another object of the invention is to provide an auxiliary carriage position establishing mechanism which is particularly suited for use in connection with proportional spacing escapement mechanism, for example, of the kind in which the extent of a letter spacing movement may be determined by the engagement of an escapement pawl with an escapement ratchet at a tooth interspace located one or more tooth interspaces from the tooth last engaged by the pawl.

Another object of the invention is to provide carriage position determining or establishing mechanism of the kind referred to which is especially adaptable for use in connection with power operated typewriters.

Another object of the invention is to provide an improved proportional letter spacing mechanism for typewriters or like machines.

A further object of the invention is to provide mechanism of the kind referred to which is operable in conjunction with back spacing mechanism cooperable with a carriage letter spacing ratchet.

Other objects will become apparent from the reading of the following description, the appended claims, and the accompanying drawings, in which:

Figure 3 is a front elevation of the escapement and banking and tabulating control mechanism shown with the parts in their normal or rest positions, that is the positions occupied when the typewriter carriage is stationary after an ordinary letter spacing operation has been performed;

Figure 4 is an exploded perspective view showing parts of the letter spacing, tabulating and banking control mechanism in separated relation;

Figure 5 is a front elevation of parts of the mechanism illustrated in Figure 3, but showing the parts in the positions occupied when the mechanism is conditioned for a tabulating or a carriage returning operation;

Figure 6 is a top plan view showing mechanism operable by either the tabulating control mechanism or the carriage returning control mechanism for conditioning the mechanism shown in Figure 5 for the performance of a tabulating or a carriage returning operation;

Figure 7 is a detailed front elevation showing a letter spacing pawl locked in disabled condition;

Figure 8 is a fragmentary front elevational view of the escapement mechanism and carriage banking and tabulating mechanism, showing a letter spacing pawl disengaged from a letter spacing ratchet wheel and a tabulating and banking control pawl operatively engaged with a tabulating and banking control ratchet wheel;

Figure 9 is a front elevation similar to Figure 5, drawn on a reduced scale with some parts omitted, and showing other parts positioned following a preceding tabulating or carriage return banking operation, this view also showing parts of a back spacing mechanism; and Figure 10 is a view similar to Figure 3, but showing additionally parts of a back spacing mechanism.

GENERAL DESCRIPTION

Figure 1:
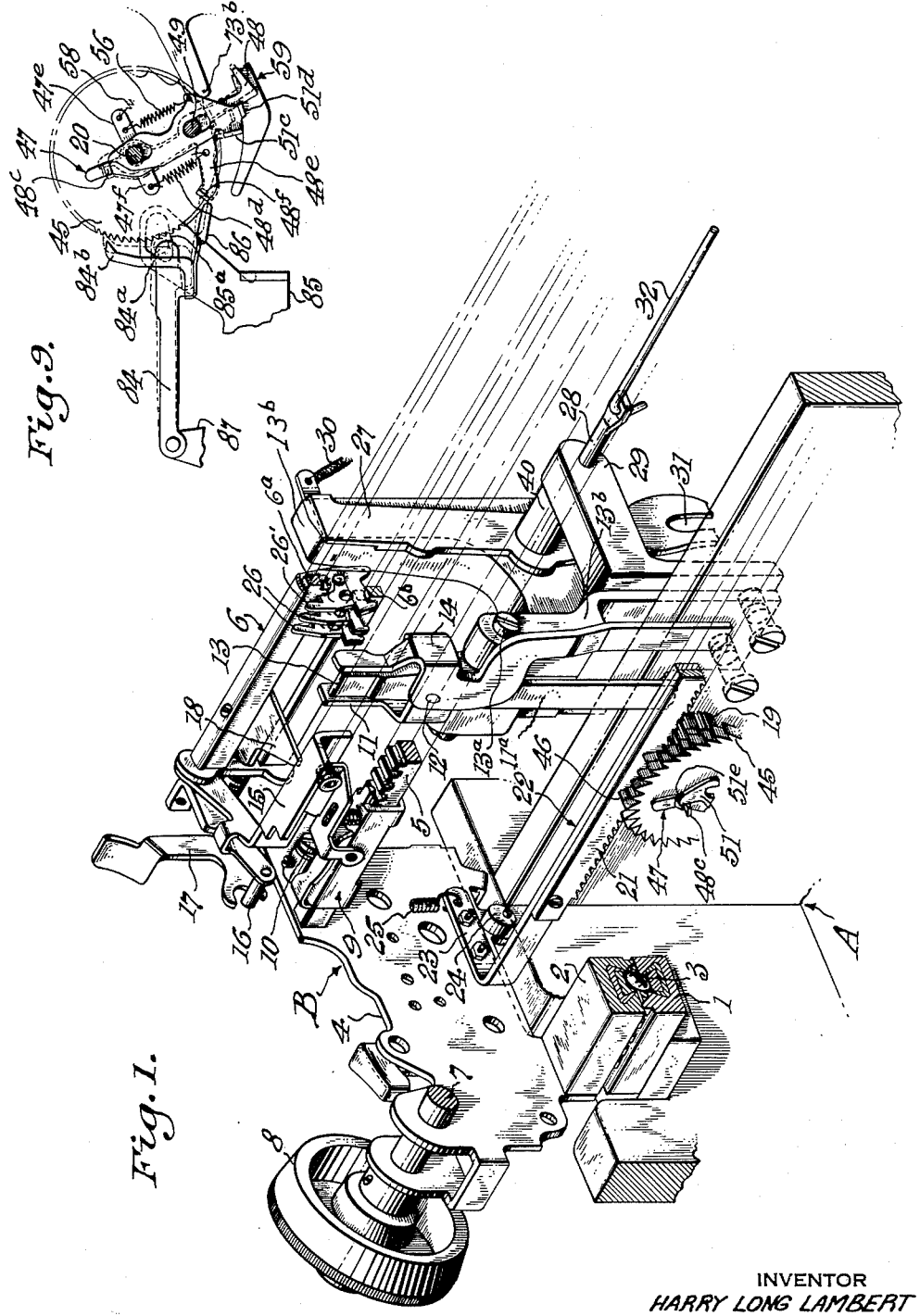
Figure 1 is a fragmentary perspective view showing only some parts of a known or conventional typewriter construction, to illustrate the relation between these parts and others shown in other views as embodying the invention.

The invention may be embodied in typewriting or like machine constructions of various kinds. For the purposes of illustration it is shown as being incorporated in a typewriter having generally the known basic construction of Royal office typewriters. As shown in Figure 1, the machine includes a main frame A on which a carriage B is mounted for letter spacing and return movements by a bottom rail 1 supported on the frame and a top rail 2 on the carriage resting upon antifriction balls 3 in a race-way on the bottom rail 1. The carriage B includes two end plates, one of which is shown at 4 in Figure 1, connected by a toothed margin stop bar 5 and a tabulating stop bar assembly 6. A platen (not shown) is mounted on the carriage end plates by a shaft 7 which may be rotated for letter spacing operation by knobs, one of which is shown at 8, and by the usual combined carriage returning and line spacing mechanism, not shown.

The toothed bar 5 carries two margin stops, one of which is shown at 9 in Figure 1 as being provided with an adjustable abutment screw 10 which is cooperable with a cushion or buffer plate 11 pivoted at 12 on a center stop 13 for determining the limit of rightward or carriage returning movement and consequently the location of the margin at the left of the work sheet. The center stop 13 is pivoted at 13ª on a bracket 13ᵇ secured to the frame A so as to be rockable in a manner to enable the center stop and the buffer plate 11 to be displaced from the path of the margin stop screw 10 by margin releasing mechanism, not shown, to permit the carriage to be moved to the right beyond its normal left margin position. The right margin stop (not shown) is mounted in the usual manner at the right end portion of the toothed bar 5 so as to be engageable with a line lock lever 14 pivoted at 12 on the center stop 13 for arresting the carriage travel toward the left and determining the margin at the right of the work sheet. The line lock lever 14 may be connected by means, not shown, to mechanism for preventing depression of the typing keys when the carriage has been arrested at the limit of its leftward or letter spacing travel. A bail 15 cooperable with the left margin stop 9 for effecting its adjustment along the toothed bar 5 is provided with a pin 16 operable by a finger lever 17. The margin stops and the associated adjusting mechanism may be generally similar to those shown in the patent to Henry J. Hart 2,208,367, dated July 16, 1940. The tabulator stop bar assembly 6 is equipped with a fixed stop 18 which is engageable with the cushioning lever 11 on the center stop 13 for determining the extreme limit of carriage travel to the right.

Travel of the carriage to the left, that is in the letter spacing direction, is controlled by primary carriage positioning means comprising escapement mechanism including a pinion 19 mounted for rotation on a shaft 20 supported by the frame A, and a rack 21 engageable with the pinion 19. The rack 21 is carried by a bail 22 having two pivoted arms, one of which is shown at 23 as being pivoted at 24 on the carriage end plate 4. Springs, one of which is shown at 25, connected to the rear ends of the bail arms and to the carriage frame urge the bail to rock counterclockwise, as viewed in Figure 1, for normally maintaining the rack 21 in engagement with the pinion 19, the springs however being yieldable to permit the bail to be rocked clockwise so as to disengage the rack 21 from the pinion 19 and enable the carriage to be positioned manually with respect to the frame A in the usual manner. Step-by-step rotation of the pinion 19 to enable incremental letter spacing movement of the carriage to the left is controlled by mechanism to be described later.

The tabulator stop assembly 6 comprises upper and lower toothed bars 6ª and 6ᵇ provided with opposed grooves or slots for mounting a plurality of tabulator stops, two of which, 26, are shown in normal or inoperative positions in Figure 1, and one of which is shown at 26' in projected position for cooperation with a tabulator stop blade 27 carried by a pivot rod or shaft 28 rotatable and slidable in a main frame mounted bracket 29. The construction of stops 26 and 26' and their mounting on the tabulator stop bar assembly 6 are similar to the construction and mounting of tabulator stops disclosed in more detail in the patent to Lewis C. Myers et al. No. 1,892,071, dated December 27, 1932.

Normally, the frame-mounted tabulator blade or stop 27 is held in retracted position by a spring 30 so as not to be engageable with a projected tabulator stop 26' on the carriage B. The lower end of the stop blade 27 is formed with a notch 31 cooperable with mechanism, not shown, by which the blade 27 may be rocked counterclockwise as viewed in Figure 1 to position its upper end in the path of a projected tabulator stop 26' for bringing the carriage to rest at the end of a tabulating run.

A link 32 pivoted to the tabulator blade pivot rod 28 extends rightwardly of the machine and has its right end pivoted at 33 to a latching lever 34, itself pivoted at 35 on a bracket 36 mounted on a frame cross bar 37. A spring 38 connected between the rear end of the lever 34 and an ear 39 on the bracket 36 urges the lever 34 clockwise, as viewed in Figures 2 and 6, and in turn urges the link 32 and pivot rod 28 toward the right. The rightward movement of the pivot rod 28 and the tabulator blade 27 mounted on the rod 28 is limited by engagement of a sleeve 40 on the rod 28 with the inner or left side face of the bracket 29. When the sleeve 40 engages the inner face of the bracket 29, the tabulator blade 27 is disposed a short distance to the right of the bracket 13ᵇ.

Figure 2:
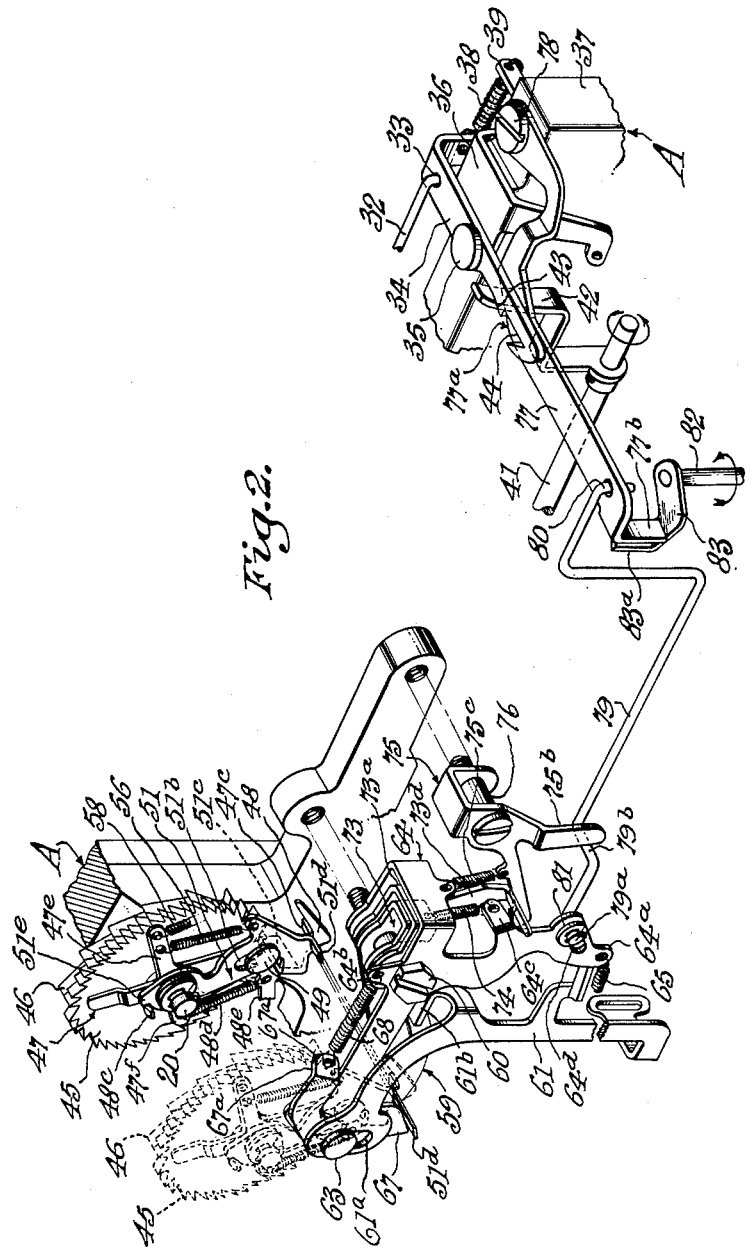
Figure 2 is a fragmentary perspective view of letter spacing and tabulating and banking or margin control mechanism embodying the invention, an escapement and banking and tabulating wheel assembly being shown in separated relation to mechanism which controls the operation of the wheel assembly.

A shaft 41, rotatable by tabulation initiating mechanism, not shown, is equipped with an arm 42, the upper end of which is normally disposed to the rear of a cam surface 43 on the latch 34 as shown in Figures 2 and 6. When a tabulation operation is initiated, the shaft 41 and arm 42 are rocked counterclockwise, as viewed in Figure 2, until the arm 42 is latched in the notch 44 of the latch lever 34. During the rocking of the arm 42, mechanism, not shown, acts upon the slot 31 at the lower end of the tabulator blade 27 for rocking the blade counterclockwise, as viewed in Figure 1, to position the blade upper end in the path of a projected tabulator stop 26', the latching of the arm 42 by the lever 34 maintaining the blade 27 in its operative position during the carriage tabulating run.

The tabulating run of the carriage is effected by disabling the escapement mechanism in a manner to be described later to enable the pinion 19 to run free on its shaft 20. As the carriage approaches the end of its tabulating run, the projected stop 26' at the right of the blade 27 engages the latter and moves it to the left until it abuts the bracket 13ᵇ, whereupon the carriage tabulating run is terminated. The leftward movement of the blades 27 is accompanied by leftward movement of the pivot rod 28 and link 32 which rocks the latch lever 34 counterclockwise against the urge of the spring 38, thus releasing the arm 42 to permit the latter and the shaft 41 to rock clockwise, as viewed in Figure 2, for restoring the tabulator blade 27 to its retracted position and re-enabling the escapement mechanism. With the exception of the means to be described hereinafter for disabling and re-enabling the escapement mechanism, the tabulating mechanism described above is generally similar to the tabulating mechanism described in more detail in the patent to George M. Utz, No. 2,757,777, dated August 7, 1956.

The illustrated mechanism described above does not, in itself, constitute the present invention, the invention instead residing in other parts and mechanism to be described, and in the combinations thereof with those which have been described to this point.

*Proportional spacing escapement mechanism*

The escapement mechanism for controlling the letter spacing movements of the carriage by relatively small increments includes a relatively fine toothed ratchet wheel 45 rotatable on the shaft 20 and being fast with a relatively coarse toothed tabulating and banking control ratchet wheel 46 secured to the pinion 19, both ratchet wheels 45 and 46 being rotatable on the shaft 20 and being secured to the pinion 19 to rotate therewith. A four-armed swinging latch interponent 47 is formed with an opening 47ª which mounts the latch 47 on the shaft 20 in front of the fine toothed ratchet wheel 45. A long arm 47$^b$ of the latch 47 has a rearwardly projecting ear 47$^c$ beyond the periphery of the ratchet wheel 45, and a shorter arm 47$^d$ which is offset rearwardly so as to have resilient spring engagement with the face of the ratchet wheel 45.

A pawl lock 48 is formed with an opening 48$^a$ which receives a pivot stud 49 secured to the latch arm 47$^b$ and an enlarged opening 48$^b$ which surrounds the escapement pinion shaft 20 with sufficient clearance to permit limited rocking of the lock 48 about its pivotal mounting 49 on the latch 47.

A letter spacing pawl 51 is mounted frowardly of the pawl lock 48, being formed with two slots 51$^a$ and 51$^b$, respectively receiving the pinion shaft 20 and the pivot stud 49, the slots 51$^a$ and 51$^b$ being elongated radially with respect to the shaft 20 to enable the pawl 51 to move radially with respect to the shaft and the escapement ratchet wheel 45. The pawl 51, the pawl lock 48, and the latch 47 are held assembled on the shaft 20 with the ratchet wheel 45 by a split retainer washer 53 fitted into a groove 54 on the shaft 20, a smooth washer 25 being interposed between the split washer 53 and the pawl 51. The pawl 51 and the pawl lock 48 are rockable with the swinging latch 47 about the axis of the shaft 20, the pawl 51 may also have limited radial sliding movement relative to the shaft 20, and the pawl lock 48 may also have limited rocking or pivotal movement about the stud 49, as is permitted by the large opening 48$^b$.

Normally, when the carriage is at rest and the parts are conditioned for letter spacing movement of the carriage upon a subsequent typing operation's being performed, the escapement mechanism parts will be in the positions shown in Figures 2 and 3. The pawl 51 will be held radially inwardly by a spring 56 connected between the pawl and an arm 47$^e$ on the swinging latch 47, a nose 51$^c$ on the pawl being in mesh with the ratchet wheel 45. The pawl nose 51$^c$ will then abut the left face of a fixed letter spacing stop 57 extending forwardly from the stationary bracket 13$^b$ as shown in Figure 3, so that the ratchet wheel 45 will be held against counterclockwise rotation under the urge of the spring barrel or other carriage driving motor (not shown) which tends to move the escapement rack 21 to the left and consequently tends to rotate the pinion 19 and ratchet wheel 45 counterclockwise.

As hereinafter explained, when a typing key is depressed, calling for a letter spacing movement of the carriage, the pawl 51 is moved radially outwardly so as to disengage its nose 51$^c$ from the ratchet wheel 45, whereupon the pawl 51 is immediately and quickly swung clockwise about the axis of the shaft 20 until the pawl nose 51$^c$ has traversed a number of teeth on the ratchet 45 dependent upon the length of the letter spacing movement which is to ensue, according to the width of the character to be typed, the pawl 51 then being moved radially inwardly to engage its nose 51$^c$ with the appropriate tooth on the ratchet wheel 45. This disengagement of the latch nose 51$^c$ from the ratchet wheel 45 and re-engagement of the latch nose with another ratchet tooth takes place very quickly and before the carriage has been moved to any substantial extent in the letter spacing direction, the carriage being much slower in starting than the latch 51 and its associated parts, owing to the much greater weight and inertia of the carriage. After the latch nose 51$^c$ has re-engaged the ratchet wheel 45, the latter will be rotated counterclockwise under the driving urge of the rack 21 until the latch nose 51$^c$ engages and is arrested by the fixed stop 57. As thus broadly considered, the operation of the letter spacing escapement mechanism is similar to the operation of mechanism disclosed in the application of James Field Smathers, Serial No. 545,063, for Proportional Spacing Mechanism for Typewriters, filed November 4, 1955, now Patent No. 2,904,159. The proportional spacing mechanism described above, however, embodies improvements in the construction and relative arrangement and cooperation of the parts.

The mechanism for controlling the letter spacing movements of the pawl 51 includes a spacing spring 58 interposed between the arm 47$^e$ of the swinging latch interponent 47 and an ear 59$^a$ on a latch lever 59 pivoted on a stud 60 secured to the frame, the spring 58 urging the interponent 47 to swing clockwise. Normally, swinging of the latch 47 is prevented by engagement of the ear 47$^c$ with the nose 59$^b$ of the latch lever 59. By normally maintaining the swinging latch 47 against clockwise movement, the latch lever 59 maintains the pawl 51 against the clockwise movement relative to the ratchet wheel 45 required to enable the pawl tooth 51$^c$ to engage a selected different tooth of the ratchet wheel 45.

In order to enable the pawl 51 to be swung clockwise to engage a tooth of the wheel 45 selected in accordance with the required letter spacing incremental movement to follow, it is necessary not only to move the pawl 51 radially outwardly against the urge of the pawl spring 56, but also to disengage the latch lever 59 from the ear 47$^c$ of the swinging latch 47. For this purpose, a link 61 arranged to be drawn downwardly by a part 62 operable by the typing key mechanism, as through the medium of a universal bar, not shown, is formed at its upper end with a slot 61$^a$ which receives a stud 63 on a lever member 64 which is mounted to rock on the fixed stud 60. The lever 64 is urged clockwise, as viewed in Figure 3, by a spring 65 connected between an ear 64$^a$ on the lever 64 and a fixed anchor indicated at 66, clockwise rocking of the lever 64 by the spring 65 being limited by engagement of the ear 64$^a$ with a fixed stop 50 on the main frame. A limber dog 67 pivoted on the stud 63 on the lever 64 is urged clockwise by a spring 68 interposed between an ear 64$^b$ on the lever 64 and an ear 67$^a$ on the limber dog 67, clockwise movement of the limber dog 67 being limited by engagement of its somewhat rearwardly extending ear 67$^a$ with the top edge of the lever 54.

When, in consequence of depression of a typing key, the link 61 is moved downwardly, the lower end of the limber dog or interponent member 67 is pressed against an ear 51$^d$ on the pawl 51 so as to move the pawl downwardly or radially outwardly against the urge of the spring 56 and thus to disengage the pawl nose 51$^c$ from the ratchet wheel 45. The pawl 51 is locked in this disengaged position until after the pawl has been swung clockwise for subsequent re-engagement with a selected tooth on the ratchet wheel 45. For this purpose, the pawl 51 is provided with a locking surface 51$^e$ over which a locking ear 48$^c$ on the pawl lock 48 is moved by clockwise swinging of the pawl lock 48 about the stud 49 caused by a lock spring 48$^d$ interposed between an arm 47$^f$ on the swinging latch 47 and an arm 48$^e$ on the lock 48. The opening 48$^b$ in the lock 48 is sufficiently large to permit the required swinging of the lock to the position shown in Figure 7 in which its ear 48$^c$ engages the locking surface 51$^e$ on the pawl 51 to hold the latter in radially projected position.

The pawl 51 having been disengaged from the ratchet wheel 45, it is necessary to release the swinging latch 47 from the latch lever 59 to enable the spring 58 to swing the latch 47 together with the pawl 51 clockwise for enabling the pawl nose 51$^c$ to engage the selected different tooth on the ratchet wheel 45. For this purpose, the link 61 is formed with an ear 61$^b$ normally positioned a short distance above an ear 59$^c$ on the latch lever 59. When the link 61 is moved downwardly to move the latch 51 radially outwardly as explained above, the ear 61$^b$ presses against the ear 59$^c$ on the latch lever 59 so as to rock the latter counterclockwise and disengage its nose 59$^b$ from the ear 47$^c$ on the swinging latch arm 47. This will enable the spring 58 to swing the latch 47 and with it the released pawl 51 clockwise into position for engagement of the pawl nose 51c with a selected different tooth on the ratchet wheel 45.

After the pawl 51 has been swung clockwise to the extent dependent upon the amount of letter spacing movement required in accordance with the size of the character to be typed, the pawl lock 48 engages one of a plurality of stops 69, 70, 71, 71a selectively positionable in the path of the lock 48 in accordance with the letter spacing increment required. In the form shown, the stop 71a is a fixed stop and the stops 69, 70, and 71 are mounted to rock on a fixed stud 72 so that any one of the stops, to the exclusion of the other three, may be positioned effectively in the path of the lower end of the pawl lock 48. In Figure 3, the stop 71 is shown positioned outwardly beyond the path of the lower end of the lock 48 and the stop 70 is shown positioned in the path of the lower end of the lock 48. The stops 69 and 71a are also in the path of the lower end of the lock 48, but are to the left of the stop 70 so as not to be engageable with the lower end of the lock 48, since the latter will be stopped by the stop 70. Selective positioning of the stops 67, 70 and 71 is effected by mechanism, not shown, which is operable by the typing keys in such manner that when the most narrow character is to be typed the stop 71 will be moved into operative position, when a character of the next greater width is to be typed the stop 70 will be moved into operative position, when a still wider character is to be typed the stop 69 will be moved into operative position, and when the widest character is to be typed, the stops 69, 70 and 71 are all displaced from the path of the interponent 48, leaving only the fixed stop 71a positioned for cooperating with the interponent 48.

In operation, assuming that a character of medium width is to be typed, depression of the associated typing key will position the stop 70 in the path of the lock 48 as shown in Figure 3. The key depression will also move the link 61 downwardly so as to act through the interponent or dog 67 to press the pawl ear 51d radially outwardly and move the pawl 51 to disengage its nose 51c from the ratchet 45. The outward movement of the pawl 51 will bring its locking surface 51e into position to enable the lock 48 to be rocked by the spring 48d to place the stop ear 48c over the stop surface 51e, thereby locking the pawl 51 in its radially projected position, disengaged from the ratchet wheel 45. When the pawl 51 has been moved to the limit of its radially outward movement as determined by the engagement of the inner ends of the slots 51a and 51b with the shaft 20 and stud 49, further downward movement of the link 61 will be permitted by clockwise rocking of the limber dog 67 against the urge of the spring 68.

The further downward movement of the link 61 will cause the ear 61b to press downwardly upon the ear 59c on the latch lever 59 and rock the latter counterclockwise against the urge of the spring 58 until the latch nose 59b has been disengaged from the ear 47c on the swinging latch arm 47. Thereupon, the latch arm 47 and with it the pawl 51 and lock 48 will be rocked clockwise about the shaft 20 by the spring 58 until the lower end of the pawl lock 48 is arrested by the operatively positioned stop 70. The striking of the lock 48 against the stop 70 will cause the lock 48 to be rocked counterclockwise about the stud 49 from its locking position shown in Figure 7 to its non-locking position shown in Figure 3, thereby enabling the spring 56 to move the pawl 51 radially inwardly to bring its nose 51c into engagement with the selected different tooth on the ratchet 45. With the pawl nose 51c thus re-engaged with the ratchet 45, the assembly comprising the ratchet wheel 45, the swinging arm 47, the lock 48, and the pawl 51 will then be rotated counterclockwise by the driving of the pinion 19 by the carriage escapement rack 21 until the swinging arm ear 47c has been re-engaged by the latch nose 59b and the pawl ear 51c has been stopped by its engagement with the fixed stop or abutment 57. This will complete a letter spacing operation.

Auxiliary carriage positioning mechanism

The mechanism described above is cooperable with other mechanism for controlling the positioning of the carriage at the end of a continuous uninterrupted travel, e.g. a tabulating run toward the left, and following a carriage returning operation to the right.

Positioning carriage after tabulating operation

In the performance of a tabulating operation, the pawl 51 is disengaged from the fine toothed wheel 45 so as to render the pinion 19 free to rotate and permit the carriage escapement rack 21 and carriage to be driven uninterruptedly to the left until its tabulating movement is terminated by engagement of the operatively positioned stop 26' with the forwardly projected upper end of the tabular stop blade 27. Since the carriage is moving at considerable velocity when its stop 26' engages the stop blade 27 and the latter is abruptly stopped by the bracket 13b there is, as in the operation of substantially all typewriters, a considerable tendency for the carriage to rebound toward the right to an extent dependent upon the severity of the impact. Consequently, if it were attempted to effect re-engagement of the pawl 51 with the ratchet wheel 45 immediately upon termination of the tabulating run for holding the carriage stationary upon subsequent rearward movement of the top of the stop blade 27, there could be no certainty that the pawl nose 51c would engage just the right one of the closely adjacent teeth on the ratchet 45 for positioning the carriage in the precise location required. This may be attributed to the fact that the pitch of the teeth on the ratchet wheel 45 is so small that at the end of one tabulating run the carriage rebounding occurring before the pawl nose 51c could re-engage the ratchet wheel 45 would be such as to cause the pawl nose 51c to engage a particular tooth on the ratchet 45; whereas at the conclusion of a tabulating run of greater or lesser extent with consequent difference in the tabulating stop impact, the carriage rebounding might be so different as to cause the pawl nose 51c to move into engagement with a tooth adjacent to the particular tooth engaged by the pawl nose 51c in the first assumed operation.

In order to obviate difficulty as to proper positioning of the carriage upon withdrawal of the tabulating blade 27 from active position, the pawl 51 is maintained out of engagement with the ratchet wheel 45 after the tabulating run has terminated, and an auxiliary pawl forming part of a secondary carriage positioning means is brought into engagement with the coarse toothed ratchet 46 after the carriage has been stopped at the end of a tabulating run. In the construction shown, an auxiliary pawl 73 is mounted to rock on the pivot stud 60, and is urged clockwise as viewed in Figure 3 by a spring 74 connected between the cross part 73a of the pawl 73 and an ear 64c on the lever 64. The tension of the spring 74 tends to move the nose 73b of the auxiliary pawl 73 into engagement with the teeth of the coarse toothed ratchet 46, but normally the auxilary pawl is maintained in its inactive position shown in Figure 3 with its nose 73b disengaged from the coarse toothed ratchet 46. For this purpose, an ear 73c on the auxiliary pawl is held by a nose 75a on a latch 75 pivoted on a fixed stud 76 and urged into latching position by a spring 75c interposed between the lever 64 and the latch 75. The latch 75 maintains the auxiliary pawl 73 in this normal or inactive position during all typing operations so that the auxiliary pawl has no effect upon the rotation of the escapement pinion 19 when typing operations are being performed.

When a tabulating operation is to be performed, the letter spacing pawl 51 is disengaged from the fine toothed ratchet 45 and is locked in disengaged position in the manner previously explained. The swinging latch arm 47 is maintained against rotation about the escapement pinion shaft 20 by the latch lever 59. The auxiliary pawl 73 is maintained out of engagement with the coarse toothed ratchet 46 so as to render the carriage free to be moved to the left until arrested in the tabulated position at which time the auxiliary pawl 73 is released to be moved into engagement with the coarse toothed ratchet 46. Since the pitch of the teeth of the ratchet 46 is quite large, being four times as great as the pitch of the fine toothed ratchet 45, the parts may be very readily proportioned and adjusted to insure that when the auxiliary pawl 73 is moved into engagement with the coarse toothed ratchet 46 at the end of a tabulating operation it will be certain to engage the tooth on the coarse toothed ratchet 46 precisely determining the desired tabulated position of the carriage.

The mechanism for controlling the pawls 51 and 73 for causing the performance of a tabulating operation followed by the holding of the carriage in the proper position in readiness for a further typing operation, includes a lever 77 pivoted at 78 on the frame cross member 37 and extending horizontally forwardly of the machine below the latch lever 34. An inclined cam part 77ª of the lever 77 projects in front of the latch arm 42 when the parts are in their normal or inactive positions as shown in Figures 2 and 6, the arrangement being such that when the latch arm 42 is rocked to initiate a tabulating operation it will press against the lever inclined part 77ª so as to rock the lever 77 counterclockwise as viewed is Figure 6. A link 79 has one of its ends pivoted at 80 to the front end of the lever 77 and has its other end formed with a pin part 79ª which extends through and is slidable in a slot 64ᵈ in the lever 64. The link pin part 79ª is held in assembled relation with the lever 64 by a snap washer 81. An offset part 79ᵇ of the link 79 extends across and in close proximity to a tail 75ᵇ on the latch 75 when the parts are in their normal positions as shown in Figure 3.

Prior to the performance of a tabulating operation, the escapement mechanism, the auxiliary pawl 73 and the controlling and actuating parts will be in the positions shown in Figures 2 and 3 and in full lines in Figure 6. Depression of a tabulating key or other control device, not shown, will cause the shaft 41 and arm 42 to be rocked counterclockwise as viewed in Figure 2, thereby moving the tabulating blade 27 into projected or operating position as previously described. The latch arm 42 will engage the inclined part 77ª of the line 77 so as to rock the later from the position shown in full lines to the position shown in dotted lines in Figure 4. This will move the link 79 toward the right so as to rock the lever 64 counterclockwise against the urge of the spring 65 and move the lever ear 64ᶜ against the tail 73ᵈ of the auxiliary pawl to prevent the latter from being rocked into engagement with the coarse toothed ratchet 46 upon unlatching movement of the latch 75 caused by engagement of the link offset part 79ᵇ with the tail 75ᵇ of the latch 75. The rocking of the lever 64 also causes the limber dog 67 to press against the ear 51ᵈ on the spacing pawl 51 to move the latter radially outwardly and disengage its nose 51ᶜ from the fine toothed ratchet 45, thus freeing the ratchet wheel and escapement pinion assembly for rotation, and enabling the carriage to perform a tabulating run. When the pawl 51 is disengaged from the ratchet 45 in the performance of a tabulating operation, the swinging latch 47 is retained against swinging movement by the latch lever 59 which is not operated by rocking of the lever 64. This is because the lost motion or one way drive connection 61ª—63 permits rocking of the lever 64 without effecting downward movement of the link 61 and engagement of the link ear 61ᵇ with the ear 59ᶜ on the latch lever 59.

During the tabulating run, the lever 77, link 79, lever 64, auxiliary pawl 73 and letter spacing pawl 51 will be retained in their operated positions explained above by the spring urged latch lever 34. At the conclusion of the tabulating run, engagement of the carriage mounted tabular stop 26' with the stop blade 27 will move the latter and the link 32 toward the left to rock the latch lever 34 counterclockwise as previously explained, thereby releasing the latch arm 42 and enabling it to be returned to its normal position, and freeing the lever 77 for permitting it and the lever 64 to be returned to their normal positions. The returning movement of the lever 64 will move its ear 64ᶜ away from the tail 73ᵈ of the auxiliary pawl 73, permitting the spring 74 to rock the auxiliary pewl clockwise to bring its nose 73ᵇ into engagement with the coarse toothed ratchet 46. The auxiliary pawl ear 73ᶜ, having been positioned above the latch nose 75ª of the latch 75, as shown in Figure 5, during the tabulating run, will be able to move to the left from the positoin shown in Figure 5 without being restrained by the latch nose 75ª when the latch 75 is rocked clockwise in consequence of the returning of the lever 77 and link 79 to their normal positions.

After the carriage has been brought to rest at the end of a tabulating run, the spacing pawl 51 will still be locked out of engagement with the fine toothed ratchet 45 and the carriage will be held stationary by the auxiliary pawl 73 and the coarse toothed ratchet 46, as shown in Figure 8. When a subsequent typing operation is begun with the escapement pinion held stationary by the auxiliary pawl 73, the downward movement of the link 61 will bring its ear 61ᵇ into contact with the ear 59ᶜ on the latch lever 59 so as to rock the latter counterclockwise and disengage its nose 59ᵇ from the ear 47ᶜ on the swinging latch 47. The pin-and-slot lost motion or one way drive connection 79ª—64ᵈ between the link 79 and the lever 64 enables the latter to be rocked by movement of the link 61 without interference by the link 79 and lever 77. Disengagement of the latch lever nose 59ᵇ from the swing latch ear 47ᶜ will enable the spring 58 to swing the latch 47 clockwise until the lower end of the pawl lock 48 has engaged the selected one of the stops 69, 7, 71, 71ª, whereupon the pawl lock 48 will be moved as previously explained to unlock the pawl 51 and permit it to re-engage the ratchet wheel 45. During this operation, the ear 64ᶜ on the lever 64 will displace the auxiliary pawl tail 73ᵈ toward the right to rock the auxiliary pawl 73 counterclockwise and disengage its nose 73ᵇ from the coarse toothed ratchet, and thus enable the carriage to be driven to the left. Counterclockwise rocking of the auxiliary pawl 73 will also enable the latch 75 to be rocked by the spring 75ᶜ to bring the latch ear 75ª into holding engagement with the ear 73ᶜ on the auxiliary pawl 73. The re-latching movement of the latch 75 under the urge of the spring 75ᶜ will be permitted because at this time the link 79 will have been returned to its normal position in which the offset link part 79ᵇ is not in engagement with the latch tail 75ᵇ.

Following the re-engagement of the spacing pawl nose 51ᶜ with the fine toothed ratchet 45 and the re-latching of the auxiliary pawl 73 in its inoperative position, the escapement pinion 19 and ratchet wheel 45 will be driven counterclockwise by the carriage rack 21 until the pawl nose 51ᶜ engages the frame mounted fixed stop 57, as at the conclusion of every other letter spacing operation. This will bring the carriage to rest and complete the letter spacing operation.

*Positioning carriage after carriage returning operation*

The same considerations with respect to uncertain positioning of the carriage as apply to stopping of the carriage at the end of a tabulating run apply also with respect to stopping the carriage at the end of a return movement toward the right. Thus, if the spacing pawl 51 and the fine toothed ratchet 45 were to be relied upon to establish the left margin position of the carriage after the latter has been returned toward the right and has been brought to rest by engagement of the margin stop 9 with the cushioning or buffer blade 11 with some resultant rebounding, depending in extent upon the speed of the carriage at the time of its being arrested, there would be substantial likelihood that the left margin position of the carriage would not be consistently established, because of the susceptibility of the spacing pawl nose 51° to engage one or another of the closely spaced teeth on the ratchet wheel 45. According to the invention, the auxiliary pawl 73 and the coarse toothed ratchet 46 are rendered active as part of a carriage returning operation to supersede the action of the spacing pawl 51 and the fine toothed ratchet 45, and to insure that the left margin position of the carriage will be established precisely and consistently at the end of a carriage returning operation.

When the auxiliary carriage position mechanism is used, for example in power operated typewriters, the controlling of the normally operative letter spacing mechanism and the auxiliary carriage position determining mechanism may conveniently be effected through the operation of a carriage returning control shaft 82 fast with which is an arm 83 formed with an ear 83ª normally positioned just to the left of an ear 77ᵇ depending from the front end of the lever 77. When no carriage returning operation is being performed, the shaft 82 and arm 83 will be in the positions shown in Figures 2, 3 and 6 with the ear 83ª spaced slightly from the ear 77ᵇ so that the lever 77 may remain in its normal or inactive position.

When a carriage returning operation is initiated by mechanism not shown, but which may be generally of the kind disclosed in the patent to Henry J. Hart 2,567,937, dated September 18, 1951, the shaft 82 and arm 83 are rocked counterclockwise as viewed in Figure 6 so as to cause the ear 83ª to press against the ear 77ᵇ and rock the lever 77 counterclockwise, the shaft 82 and arm 83 then being maintained in their operated positions by a latch, not shown. As explained in the description of a tabulating operation, counterclockwise rocking of the lever 77 pulls the link 79 toward the right and rocks the lever 64 counterclockwise from its Figure 3 position to its Figure 5 position, thus disengaging the spacing pawl 51 from the fine toothed ratchet 45, and causing the spacing pawl to be locked in disengaged position by the pawl lock 48. Concomitantly, the auxiliary pawl nose 73ᵇ is held out of engagement with the coarse toothed ratchet 46 by engagement of the lever ear 64ᶜ with the auxiliary pawl tail 73ᵈ, and the latch 75 is disengaged from the auxiliary pawl ear 73ᶜ. In this way, both ratchet wheels 45 and 46 and their associated pawl mechanisms are conditioned for enabling the carriage to be returned toward the right.

When the left margin stop 9 engages the buffer or cushioning lever 11 and rocks the latter clockwise as view in Figure 1, an arm 11ª fast with and depending from the cushioning lever is moved to actuate mechanism, not shown, for unlatching the carriage return controlling shaft 82 and permitting the latter to be restored by a spring, not shown, to its normal position as shown in Figures 2, 3 and 6, thus enabling the spring 65 to return the lever 64 clockwise from the position shown in Figure 5 to the position shown in Figure 3. Returning of the lever 64 to its normal position will move the lever ear 64ᶜ toward the left so as to permit the spring 74 to rock the auxiliary pawl 73 to bring its nose 73ᵇ into engagement with the coarse toothed ratchet 46. This engaging movement of the auxiliary pawl will not be restrained by the latch 75 because at the time the lever 64 begins its returning, that is clockwise, movement, the auxiliary pawl ear 73ᶜ will be disposed above and a little to the left of the nose 75ª of the latch 75 as shown in Figure 5, so that the pawl ear 73ᶜ will merely slide over the end of the latch 75 without being restrained by the latch nose 75ª.

Since the teeth on the ratchet wheel 46 are widely spaced, it is entirely feasible for the parts to be so adjusted and co-related that for a given setting of the left margin stop 9 on its mounting bar 5 the carriage will always be brought to rest at the same predetermined position following engagement of the margin stop with the cushioning lever 11. Any rebounding of the carriage following its being arrested in its right margin position will not be large enough to cause the nose of the auxiliary pawl 73 to fail to engage the particular tooth on the ratchet wheel 46 required to establish the proper left margin position of the carriage.

When the left margin position of the carriage has thus been established, the machine will be prepared for the typing of a new line and the parts will be in the positions shown in Figure 8. When a typing key is depressed and the link 61 is moved downwardly, the lever 64 will be rocked counterclockwise to cause its ear 64ᶜ to press against the auxiliary pawl tail 73ᵈ and disengage the auxiliary pawl nose 73ᵇ from the coarse toothed ratchet wheel 46, the latch 75 being then able to move into latching engagement with the auxiliary pawl ear 73ᶜ.

The downward movement of the link 61 will also cause the latch lever 59 to be rocked counterclockwise so as to release the swinging latch 47 and permit the spring 58 to swing the latch 47 clockwise and bring the lower end of the pawl lock 48 into engagement with the operatively positioned stop 69, 70, 71, 71ª, whereupon the pawl 51 will be unlocked and permitted to move into engagement with the fine toothed ratchet 45. The letter spacing movement of the carriage will rotate the ratchet wheel 45 and the spacing pawl 51 until the pawl nose 51ᶜ engages and is stopped by the fixed stop 57.

*Back spacing operation*

Mechanism embodying the invention is capable of being operated for effecting incremental back spacing movements of the carriage B. Generally stated, a carriage incremental back spacing movement may be effected by disabling the pawl lock 48 so that it cannot lock the pawl 51 out of engagement with the letter spacing ratchet wheel 45, and forcibly rotating the ratchet wheel 45 reversely, that is clockwise as viewed in Figure 10, while maintaining the four-armed latch 47 in its normal position by continuing the latch lever 59 in its latching position.

As shown in Figure 10, a horizontally reciprocable bar or slide member 84, movable to the right by back spacing operating mechanism, not shown, is provided with a pin 84ª which extends into an upwardly and rightwardly inclined slot 85ª in a fixed frame mounted bracket 85. The bar member 84 is formed with a toothed finger 84ᵇ which is engageable with the ratchet wheel 45 upon rightward and upward movement of the right end of the bar 84 caused by sliding of the pin 84ª in the slot 85ª. For disabling the pawl lock 48, the bar 84 is provided with a finger part 86 adapted to engage an ear 48ᶠ on the pawl lock arm 48ᵉ upon rightward movement of the slide 84. The bar 84 may be operated by an actuator, a part of which is shown at 87.

In operation, and assuming the parts to be in the positions shown in Figure 10 following an ordinary letter spacing movement, the spacing pawl nose 51ᶜ will be in engagement with the ratchet wheel 45 and will be in abutment with the fixed stop 57 so as to hold the carriage against movement toward the left. The pawl lock 48 will be in non-locking position relative to the spacing pawl 51, and the auxiliary pawl 73 will be disengaged from the coarse toothed ratchet 46. Back spacing operation of the bar or slide 84 toward the right first brings the toothed finger 84ᵇ into engagement with the ratchet wheel 45 and causes the finger part 86 to engage the ear 48ᶠ on the pawl lock 48 so as to prevent the latter from subsequently moving into locking relation with the spacing pawl 51. The rightward movement of the slide 84 and rightward-upward movement of the toothed finger 84ᵇ rotates the ratchet wheel 45 reversely, that is clockwise. Clockwise movement of the ratchet wheel 45 will not rotate the spacing pawl 51 or the pawl lock 48 because these parts will be held by the latch 47, in turn held stationary by the latch lever 59. The clockwise turning of the ratchet wheel 45 will cause the spacing pawl nose 51ᶜ to be cammed radially outwardly by the engaging sloped or inclined tooth face so as to permit this tooth face to pass under and circumferentially beyond the pawl nose 51ᶜ, whereupon the pawl 51 will be snapped back, that is radially inwardly, by the spring 56 which will bring the pawl nose 51ᶜ into engagement with the next tooth interspace to the right of the one previously engaged. During the radially outward camming of the pawl nose 51ᶜ and its radially inward returning movement, the pawl nose 51ᶜ will remain in or substantially in engagement with the fixed stop 57. When the pawl nose 51ᶜ has moved back into engagement with the ratchet wheel 45, the latter will have been rotated one tooth interspace in the carriage returning or clockwise direction so as to back space the carriage by one increment. The holding of the four-armed latch 47 by the latch lever 59 will cause the pawl 51, and the ratchet wheel 45, to remain in their home positions when the back spacing operating slide 84 is returned to its normal position.

The back spacing mechanism may also operate when the parts are in the positions occupied immediately following a tabulating operation with the pawl 51 disengaged from the fine toothed ratchet 45, and the auxiliary pawl 73 in engagement with the coarse toothed ratchet 46 as shown in Figures 8 and 9. Upon clockwise or back spacing rotation of the ratchet wheel assembly 45, 46 caused by rightward movement of the back spacing bar 84, the toothed finger 84ᵇ enters a tooth interspace on the ratchet wheel 45 and, concomitantly, the finger part 86 pushes against the pawl lock ear 48ᶠ and rocks the pawl lock 48 about the stud 49 so as to displace the pawl lock ear 48ᶜ from the locking surface 51ᵉ of the spacing pawl, thus permitting the spring 56 to move the spacing pawl inwardly and bring its nose 51ᶜ into engagement with the ratchet wheel 45. Rightward movement of the back spacing bar 84 will cause a single incremental back spacing movement of the ratchet wheel 45 and carriage with the pawl nose 51ᶜ being cammed radially outwardly by the engaged tooth on the ratchet wheel 45 and being then returned into engagement with the next succeeding tooth. During this out-and-in movement of the pawl 51, it will be held against swinging movement by the latch 47 and latch lever 59. The auxiliary pawl 73 will be in engagement with the coarse toothed ratchet wheel 46 during a back spacing operation effected immediately after a tabulating operation, but will not interfere with the back spacing rotation of the ratchet wheel assembly 45, 46 since the auxiliary pawl nose 73ᵇ will be merely pushed outwardly by the inclined surface of the tooth on the ratchet wheel 46.

If required, a succession of back spacing operations may be performed by merely reciprocating the bar 84 a number of times corresponding to the desired total back spacing movement required. If four or more back spacing incremental movements are effected, the auxiliary pawl nose 73ᵇ will drop into a succeeding tooth interspace on the coarse toothed ratchet wheel 46 without interfering with the back spacing operation.

The construction disclosed embodies the invention in a preferred form, but it is intended that the disclosure be illustrative rather than definitive, the invention being defined in the appended claims.

I claim:

1. In a typewriter or like machine having a frame and a carriage mounted thereon for letter spacing and return travel, letter spacing mechanism including primary carriage positioning means for effecting relatively small increments of carriage letter spacing travel and establishing the position of the carriage at the end of an incremental letter spacing movement; tabular stop means for arresting the carriage at the end of a carriage tabulating travel; secondary carriage positioning means ineffective upon said carriage during incremental letter spacing carriage travel but being adapted to be rendered effective for positioning and maintaining said carriage at rest in a selected one of a plurality of positions separated from each other by increments which are relatively large as compared to said relatively small increments of carriage letter spacing travel effected by said primary carriage positioning means; and means operable in response to operation of said tabular stop means in the arresting of said carriage for rendering said secondary carriage positioning means effective to supersede said primary carriage positioning means and establish the at rest position of said carriage at the end of the carriage tabulating travel after the arresting of the carriage by said tabular stop means, whereby said secondary carriage positioning means, although effective for holding the carriage properly positioned after a tabulating travel, is prevented from being subjected to the shock of stopping the carriage while the latter is travelling at normal tabulating speed.

2. In a typewriter or like machine having a frame and a carriage mounted thereon for letter spacing and return travel, letter spacing mechanism including primary carriage positioning means for effecting relatively small increments of carriage letter spacing travel and establishing the position of the carriage at the end of an incremental letter spacing movement; tabulating means for disabling said primary carriage positioning means to enable a continuous uninterrupted carriage tabulating travel; tabular stop means for arresting the carriage at the end of a carriage tabulating travel; secondary carriage positioning means ineffective upon said carriage during incremental letter spacing carriage travel but being adapted to be rendered effective for positioning and maintaining said carriage at rest in a selected one of a plurality of positions separated from each other by increments which are relatively large as compared to said relatively small increments of carriage letter spacing travel effected by said primary carriage positioning means; and means operable in response to operation of said tabular stop means in the arresting of said carriage for rendering said secondary carriage positioning means effective to establish the at rest position of said carriage at the conclusion of the carriage tabulating travel after the arresting of the carriage by said tabular stop means, whereby said secondary carriage positioning means, although effective for holding the carriage properly positioned after a tabulating travel, is prevented from being subjected to the shock of stopping the carriage while the latter is travelling at normal tabulating speed.

3. In a typewriter or like machine having a frame and a carriage mounted thereon for letter spacing and return travel, letter spacing mechanism including primary carriage positioning means for effecting relatively small increments of carriage letter spacing travel and establishing the position of the carriage at the end of an incremental letter spacing movement; stop means for arresting the carriage at the end of a continuous uninterrupted travel thereof a distance greater than one of said relatively small increments of letter spacing travel; secondary carriage positioning means ineffective upon said carriage during incremental letter spacing carriage travel; means operable in response to arresting of said carriage by said stop means for rendering said secondary carriage positioning means effective to supersede said primary carriage positioning means and establish the position of said carriage at the conclusion of the continuous uninterrupted carriage travel; and means operable in response to the typing operation next succeeding the establishing of the carriage position by said secondary carriage positioning means for disabling said secondary carriage positioning means and restoring said carriage to the control of said primary carriage positioning means.

4. In a typewriter or like machine having a frame and a carriage mounted thereon for letter spacing and return travel, letter spacing mechanism including relatively fine toothed ratchet means for effecting relatively small increments of carriage letter spacing travel and establishing the position of the carriage at the end of an incremental letter spacing movement; stop means for arresting the carriage at the end of a continuous uninterrupted travel thereof a distance greater than one of said relatively small increments of letter spacing travel; relatively coarse toothed ratchet means for establishing the position of said carriage at the conclusion of a continuous uninterrupted travel thereof a distance greater than one of said relatively small increments of letter spacing travel but being ineffective upon said carriage during incremental letter spacing carriage travel; means operable in response to arresting of said carriage by said stop means for rendering said relatively coarse toothed ratchet means effective to supersede said relatively fine toothed ratchet means and establish the position of said carriage at the conclusion of the continuous uninterrupted carriage travel; and means operable in response to the typing operation next succeeding the establishing of the carriage position by said relatively coarse toothed ratchet means for disabling said relatively coarse toothed ratchet means and restoring said carriage to the control of said relatively fine toothed ratchet means.

5. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, and means for disengaging said letter spacing pawl from said relatively fine toothed ratchet and effecting reengagement of said letter spacing pawl with said relatively fine toothed ratchet in a tooth interspace different from that previously engaged to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; and means effective when said carriage is arrested by said other stop means for preventing engagement of said letter spacing pawl with said relatively fine toothed ratchet and for effecting engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel.

6. In a typewriter or like machine having a frame and a carriage mounted thereon for letter spacing and return travel, type width proportional letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, and means for disengaging said letter spacing pawl from said relatively fine toothed ratchet and effecting re-engagement of said letter spacing pawl with said relatively fine toothed ratchet in a tooth interspace spaced from the tooth interspace previously engaged by said pawl a selected number of one or more tooth interspaces to enable a selected length incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; and means effective when said carriage is arrested by said other stop means for preventing engagement of said letter spacing pawl with said relatively fine toothed ratchet and for effecting engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel.

7. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, and means for disengaging said letter spacing pawl from said relatively fine toothed ratchet and effecting reengagement of said letter spacing pawl with said relatively fine toothed ratchet in a tooth interspace different from that previously engaged to enable an incremental letter spacing movement of said carriage to take place at the end of which movement said letter spacing pawl engages said letter spacing stop to establish the position of said carriage; margin stop means for arresting said carriage at the end of a carriage return travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; and means effective when said carriage is arrested by said margin stop means for preventing engagement of said letter spacing pawl with said relatively fine toothed ratchet and for effecting engagement of said auxiliarly pawl with said relatively coarse toothed ratchet, whereby said auxiliary carriage position establishing means supersedes said letter spacing mechanism in establishing the position of said carriage at the conclusion of said carriage return travel.

8. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, and means for disengaging said letter spacing pawl from said relatively fine toothed ratchet and effecting reengagement of said letetr spacing pawl with said relatively fine toothed ratchet in a toth interspace different from that previously engaged to enable an incremental letter spacing movement of said carriage to take place at the end of which movement said letter spacing pawl engages said letter spacing stop to establish the position of said carriage; tabular stop means for arresting said carriage at the end of a carriage tabulating travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; and means effective when said carriage is arrested by said tabular stop means for preventing engagement of said letter spacing pawl with said relatively fine toothed ratchet and for effecting engagement of said auxiliary pawl with said relatively coarse toothed ratchet, whereby said auxiliary carriage position establishing means supersedes said letter spacing mechanism in establishing the position of said carriage at the conclusion of said carriage tabulating travel.

9. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, and means for disengaging said letter spacing pawl from said relatively fine toothed ratchet and effecting reengagement of said letter spacing pawl with said relatively fine toothed ratchet in a tooth interspace different from that previously engaged to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; means effective when said carriage is arrested by said other stop means for preventing engagement of said letter spacing pawl with said relatively fine toothed ratchet and for effecting engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel; and means operable in response to the typing operation next succeeding the establishing of the carriage position by said auxiliary carriage positioning means for disabling sad auxiliary carriage positonng means and restoring said carriage to the control of said letter spacing mechanism.

10. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, means for disengaging said letter spacing pawl from said relatively fine toothed ratchet, a pawl lock for holding said letter spacing pawl disengaged from said fine toothed ratchet, a spacing spring for shifting said letter spacing pawl to a position of registration with a tooth interspace on said fine toothed ratchet different from the tooth interspace previously engaged, and means responsive to such shifting of said letter spacing pawl for releasing said pawl lock from said letter spacing pawl to enable said spring means to move said letter spacing pawl into said different tooth interspace, whereby to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; means effective when said carriage is arrested by said other stop means for preventing said spacing spring from shifting said letter spacing pawl and thereby maintaining said pawl lock operative to hold said letter spacing pawl disengaged from said fine toothed ratchet, and for causing engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel.

11. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, means for disengaging said letter spacing pawl from said relatively fine toothed ratchet, a pawl lock for holding said letter spacing pawl disengaged from said fine toothed ratchet, a spacing spring for shifting said letter spacing pawl to a position of registration with a tooth interspace on said fine toothed ratchet different from the tooth interspace previously engaged, and means responsive to such shifting of said letter spacing pawl for releasing said pawl lock from said letter spacing pawl to enable said spring means to move said letter spacing pawl into said different tooth interspace, whereby to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; means effective when said carriage is arrested by said other stop means for preventing said spacing spring from shifting said letter spacing pawl and thereby maintaining said pawl lock operative to hold said letter spacing pawl disengaged from said fine toothed ratchet, and for causing engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel; and means operable in response to the typing operation next succeeding the establishing of the carriage position by said auxiliary carriage positioning means for disabling said auxiliary carriage positioning means and restoring said carriage to the control of said letter spacing mechanism.

12. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, means including a spacing spring for urging said letter spacing pawl to move away from said letter spacing stop, means including a latch for holding said letter spacing pawl against movement away from said letter spacing stop, means responsive to a typing operation for disengaging said letter spacing pawl from said fine toothed ratchet and for disengaging said latch to enable said spacing spring to shift said letter spacing pawl to a position of registration with a tooth interspace on said fine toothed ratchet different from the tooth interspace previously engaged, a pawl lock for holding said letter spacing pawl disengaged from said fine toothed ratchet while being shifted by said spacing spring, and means responsive to such shifting of said letter spacing pawl for releasing said pawl lock from said letter spacing pawl to enable said spring means to move said letter spacing pawl into said different tooth interspace, whereby to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; control means for disengaging said letter spacing pawl from said fine toothed ratchet incident to said continuous uninterrupted carriage travel without releasing said latch; and means responsive to arresting of said carriage by said other stop means for effecting engagement of said auxiliary pawl with said relatively coarse toothed ratchet without causing re-engagement of said letter spacing pawl with said relatively fine toothed ratchet, whereby said auxiliary carriage position determining means supersedes said letter spacing mechanism in establishing the position of said carriage at the conclusion of said continuous uninterrupted carriage travel.

13. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, means including a spacing spring for urging said letter spacing pawl to move away from said letter spacing stop, means including a latch for holding said letter spacing pawl against movement away from said letter spacing stop, a member operable for disengaging said letter spacing pawl from said fine toothed ratchet, actuating means operable in response to a typing operation, a one-way-drive connection between said actuating means and said member for operating said member to disengage said letter spacing pawl from said fine toothed ratchet, said actuating means having means for disengaging said latch when said actuating means is operated to enable said spacing spring to shift said letter spacing pawl to a position of registration with a tooth interspace on said fine toothed ratchet different from the tooth interspace previously engaged, a pawl lock for holding said letter spacing pawl disengaged from said fine toothed ratchet while being shifted by said spacing spring, and means responsive to such shifting of said letter spacing pawl for releasing said pawl lock from said letter spacing pawl to enable said spring means to move said letter spacing pawl into said different tooth interspace, whereby to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; control means operable upon said member for disengaging said letter spacing pawl from said fine toothed ratchet incident to said continuous uninterrupted carriage travel, said one-way-drive connection enabling said member to be operated and said letter spacing pawl to be disengaged from said fine toothed ratchet without operating said actuating means and without releasing said latch; and means responsive to arresting of said carriage by said other stop means for effecting engagement of said auxiliary pawl with said relatively coarse toothed ratchet, whereby said auxiliary carriage position determining means supersedes said letter spacing mechanism in establishing the position of said carriage at the conclusion of said continuous uninterrupted carriage travel.

14. In a typewriter or like machine having a frame and a carriage mounted thereon for letter spacing and return travel; a toothed letter spacing ratchet; a letter spacing pawl; a pawl spring urging said letter spacing pawl into engagement with said ratchet; a letter spacing stop with which said letter spacing pawl is engageable for holding said carriage against letter spacing travel; means for urging said letter spacing pawl to move away from said letter spacing stop including an interponent operatively connected to said letter spacing pawl for movement relatively thereto, and a spacing spring urging said interponent to move; a latch normally engaging said interponent for maintaining it against being moved by said spacing spring and thereby normally preventing movement of said letter spacing pawl away from said letter spacing stop; a pawl lock mounted for movement relative to said letter spacing pawl and said interponent and normally being ineffective for locking said letter spacing pawl; a lock spring urging said pawl lock to move to locking position when said letter spacing pawl is moved against the urge of said pawl spring to disengage said letter spacing pawl from said ratchet, said pawl lock when in locking position maintaining said letter spacing pawl disengaged from said ratchet, whereby to enable said spacing spring to move said interponent, said pawl and said pawl lock together relatively to said ratchet; another stop engageable by said pawl lock when the latter and said interponent and said letter spacing pawl have been moved by said spacing spring for moving said pawl lock to unlock said letter spacing pawl and enable the latter to be moved by said pawl spring back into engagement with said ratchet in a tooth interspace removed from the tooth interspace previously engaged by said letter spacing pawl; and means responsive to a typing operation for disengaging said letter spacing pawl from said ratchet and disengaging said latch from said interponent.

15. In a typewriter or like machine having a frame and a carriage mounted thereon for letter spacing and return travel; a toothed letter spacing ratchet; a letter spacing pawl; a pawl spring urging said letter spacing pawl into engagement with said ratchet; a letter spacing stop with which said letter spacing pawl is engageable for holding said carriage against letter spacing travel; means for urging said letter spacing pawl to move away from said letter spacing stop including an interponent operatively connected to said letter spacing pawl for movement relatively thereto, and a spacing spring urging said interponent to move; a latch normally engaging said interponent for maintaining it against being moved by said spacing spring and thereby normally preventing movement of said letter spacing pawl away from said letter spacing stop; a pawl lock mounted for movement relative to said letter spacing pawl and said interponent and normally being ineffective for locking said letter spacing pawl; a lock spring urging said pawl lock to move to locking position when said letter spacing pawl is moved against the urge of said pawl spring to disengage said letter spacing pawl from said ratchet, said pawl lock when in locking position maintaining said letter spacing pawl disengaged from said ratchet, whereby to enable said spacing spring to move said interponent, said pawl and said pawl lock together relatively to said ratchet; another stop engageable by said pawl lock when the latter and said interponent and said letter spacing pawl have been moved by said spacing spring for moving said pawl lock to unlock said letter spacing pawl and enable the latter to be moved by said pawl spring back into engagement with said ratchet in a tooth interspace removed from the tooth interspace previously engaged by said letter spacing pawl; means including a limber dog responsive to a typing operation for disengaging said letter spacing pawl from said ratchet; and other means responsive to a typing operation for disengaging said latch from said interponent.

16. In a typewriter or like machine having a frame and a carriage mounted thereon for letter spacing and return travel, letter spacing mechanism including a relatively fine toothed ratchet, a letter spacing pawl, spring means urging said letter spacing pawl into engagement with said relatively fine toothed ratchet, a letter spacing stop with which said letter spacing pawl is engageable for holding said carriage against letter spacing travel, means for disengaging said letter spacing pawl from said relatively fine toothed ratchet, a pawl lock for holding said letter spacing pawl disengaged from said fine toothed ratchet, a spacing spring for shifting said letter spacing pawl to a position of registration with a tooth interspace on said fine toothed ratchet different from the tooth interspace previously engaged, and means responsive to such shifting of said letter spacing pawl for releasing said pawl lock from said letter spacing pawl to enable said spring means to move said letter spacing pawl into said different tooth interspace, whereby to enable an incremental letter spacing movement of said carriage to take place at the end of which movement said letter spacing pawl engages said letter spacing stop to establish the position of said carriage; other stop means for arresting said carriage at the end of a continuous uninterrupted travel thereof a distance greater than one of said relatively small increments of letter spacing travel; auxiliary carriage position establishing means including a relatively coarse toothed ratchet, an auxiliary pawl engageable therewith, and means retaining said auxiliary pawl disengaged from said relatively coarse toothed ratchet during incremental carriage letter spacing movements; means effective when said carriage is arrested by said other stop means for preventing said spacing spring from shifting said letter spacing pawl and thereby maintaining said pawl lock operative to hold said letter spacing pawl disengaged from said fine toothed ratchet, and for causing engagement of said auxiliary pawl with said relatively coarse toothed ratchet, whereby said auxiliary carriage position establishing means supersedes said letter spacing mechanism in establishing the position of said carriage at the conclusion of said continuous uninterrupted carriage travel; and carriage back spacing means comprising a toothed member engageable with said relatively fine toothed ratchet, and a part engageable with said pawl lock for preventing the latter from holding said letter spacing pawl disengaged from said relatively fine toothed ratchet during a carriage back spacing operation.

References Cited in the file of this patent
UNITED STATES PATENTS

| | | |
|---|---|---|
| 1,484,113 | Crawley | Feb. 19, 1924 |
| 1,873,553 | Crumrine | Aug. 23, 1932 |
| 2,353,095 | Von Reppert | July 4, 1944 |